R. C. PURVIS.
CHAIN ARMOR FOR PNEUMATIC TIRES.
APPLICATION FILED JULY 11, 1914.
1,262,254.
Patented Apr. 9, 1918.
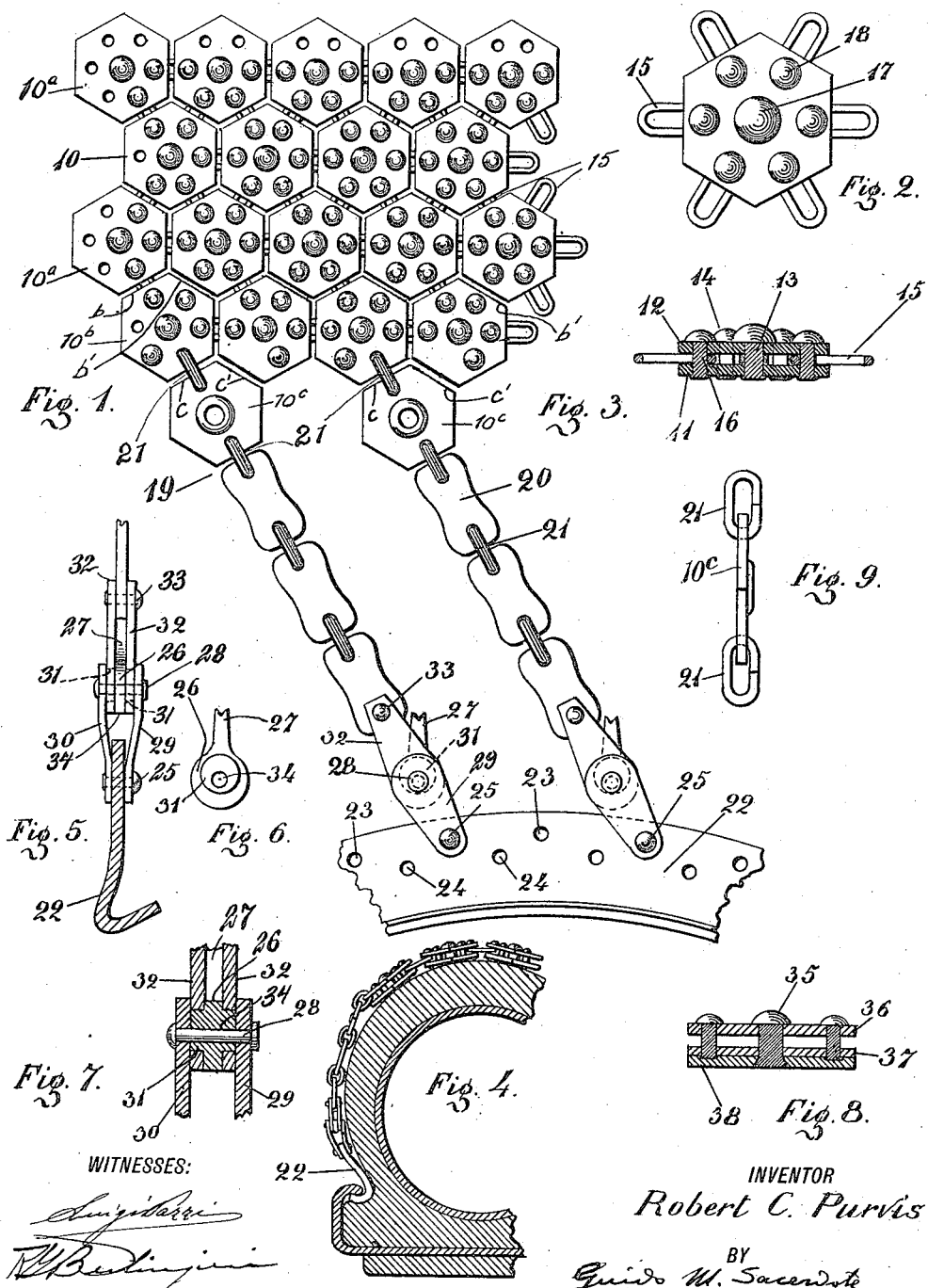
WITNESSES:
INVENTOR
Robert C. Purvis
BY
Guido M. Sacerdote
ATTORNEY

UNITED STATES PATENT OFFICE.

ROBERT C. PURVIS, OF SEAFORD, DELAWARE.

CHAIN ARMOR FOR PNEUMATIC TIRES.

1,262,254.    Specification of Letters Patent.    Patented Apr. 9, 1918.

Application filed July 11, 1914. Serial No. 850,477.

*To all whom it may concern:*

Be it known that I, ROBERT C. PURVIS, a citizen of the United States, residing at Seaford, in the county of Sussex and State of Delaware, have invented certain new and useful Improvements in Chain Armor for Pneumatic Tires; and I do declare the following to be a full, clear, and exact description of the invention, reference being had to the accompanying drawings, forming a part of this specification.

This invention refers to armors for automobile tires and more particularly to armors mainly protecting the tread portion of the tire, attached and retained in position by means of a plurality of side chains.

One of the objects of this invention is to provide an improved type of armor for pneumatic tires which shall at one time satisfactorily answer to all the requirements of such a device that is great flexibility rendering the device adapted to perfectly fit the outline of the tire, adhering closely to the same, lightness, strength and good wearing qualities.

Another object of this invention is to provide an improved construction of armor for pneumatic tires comprising diagonal side chains retaining the device in position and insuring a perfect fit of the same on the tire at all times, this being due to the diagonal pulling action of said chains.

A further object is to provide an improved method for taking up the slack or releasing the armor to perfectly fit the tension of the tire.

With these and other objects in view, such as will more fully appear as the description proceeds, this invention consists of certain novel constructions and arrangements of parts as will be hereinafter described and claimed in the appended claims.

My improved armor consists essentially of a tread portion composed of a plurality of metallic disks connected to form a flexible fabric, and a plurality of chains diagonally extending on each side from said tread portion. In the construction of said tread portion I prefer in all cases to use hexagonal elementary disks flexibly connected to each other such as described and claimed in a previous patent application for armors for pneumatic tires, filed by me July 12, 1910, Serial No. 571,597, (now Patent 1,112,030).

In the construction of the elementary disks themselves, and in the flexible connections between the same, I furthermore prefer to use the method described and claimed in a patent application for protective armor for pneumatic tires, Serial No. 850,476, filed simultaneously herewith, on account of the excellent frictional surface and wearing qualities possessed by a fabric of this type.

In my previous patent application for armors for pneumatic tires, the advantages of flexibly connected hexagonal disks have been extensively demonstrated. By means of this form of disk it is possible to obtain a perfectly close surface impenetrable to sharp pointed or sharp edged objects, while at the same time if flexible connections of the proper forms are provided, it is possible to obtain a great flexibility and perfect fit to the surface of the underlying tire. In said patent application I have fully demonstrated the advantages given by using a construction of armor in which diagonal rows of disks or chains are used to retain the device in position, the pull of the road on said oblique rows of chains forcing the armor into close contact with the surface of the tire. For the proper working of a device of this kind, it is absolutely essential that the same be closely adhering to the surface of the tire at all times, to prevent slippage, wear and abrasion of the tire, which are the unavoidable consequences if the armor is not properly constructed.

The chains retaining the device in position can be secured to the rim of the wheel in any suitable manner, and in the drawings is illustrated the preferred method of doing this which, I will, at a later stage, more fully describe. I also provide means, as hereinbefore stated, for taking up the slack or releasing the armor to suit the tension of the tire, and all these various details of my invention are shown in their preferred form in the annexed drawings, in which:

Figure 1 is a fragmentary side view in elevation of my improved armor attached to a rim member;

Fig. 2 is a plan view of a disk and connecting links such as employed in the preferred construction of the tread portion of the armor;

Fig. 3 is a cross sectional view of the same;

Fig. 4 is a fragmentary cross sectional view of a tire with the armor applied thereto;

Fig. 5 is a cross sectional view in elevation of the rim member showing the method of attaching one of the chains to the same;

Fig. 6 is a detail plan view of the eccentric block used for taking up the slack or releasing the armor;

Fig. 7 is a detail cross sectional view in elevation of the attaching portion of the chain showing the operation of the eccentric block;

Fig. 8 is a cross sectional view in elevation of a disk provided with an insulating backing to prevent abrasion of the tire; and Fig. 9 is a detail side or edge view in elevation showing the way of connecting end to end the elements composing the chains.

Referring to said drawings it is seen that the tread portion of my armor is composed of a plurality of closely abutting hexagonal disks flexibly connected to each other said disks being of the construction described and claimed in my patent application for protective armor for pneumatic tires, filed simultaneously herewith, the detailed structure of the individual disks being clearly illustrated in Figs. 2 and 3. In Fig. 1 is illustrated a small portion of a complete armor constructed in accordance with the present invention. It is to be understood that the armor extends lengthwise or circumferentially to left and right of the portion shown in Fig. 1 and that approximately only one half the entire width of the armor in the transverse direction is shown in this figure. In the present example, the armor fabric proper is composed of a plurality of hexagonal disks of a structure to be more fully hereinafter described. These disks are in close arrangement with their edges almost or substantially abutting and are connected together in such manner as to give the resultant assemblage extreme flexibility.

In Fig. 1, the spaces between the adjacent disk edges are rather wider, especially in the tread portion of the armor, than is usual or necessary in practice; the present showing being for the purpose of permitting clearer illustration of the connecting members or links securing the disks together.

In Fig. 1 disks 10 are connected together in approximate end-to-end abutment to form a row extending lengthwise of the armor and centrally of its tread. Each disk in this central row has its two opposite pairs of lateral edges linked to the adjacent edges of disks $10^a$ which are connected end to end in two rows extending lengthwise, one on each side of the central row and parallel thereto. Outside of each row of disks $10^a$, disks $10^b$ are connected end to end into similar longitudinal rows; but it is to be noted that only alternate edges $b$ adjacent the disks $10^a$ are connected to said disks, the remaining edges $b'$ adjacent disks $10^a$ being left free as shown. This method of alternate linkage may also be employed in connecting the rows of disks $10^a$ to the central row of disks 10, but, in practice, it is preferred to follow the method of linkage above described.

The disks 10, $10^a$ and $10^b$ are composed of an inner plate 11 and an outer plate 12 and a master rivet 13 connecting said two plates together. On said master rivet is inserted a washer 14, keeping the two plates at a proper distance to allow free working of connecting links 15; said connecting links 15 are retained in position by stud rivets 16, but are free to move within the gap provided between the two plates composing the disk.

The master rivet 13 is provided with a large head 17, and stud rivets 16 are each provided with a large head 18, said rivet heads projecting from the surface of outer plate 12. The form of disk connection just described peculiarly answers to the requirements of the service to which the device is put, as the rivet heads present an excellent friction and wearing surface, taking up all the contact with the road and leaving sufficient space to prevent the suction on said road, at the same time ventilating the fabric and keeping it cool. The connecting links, on the other hand, are protected from wear, and therefore the armor will last almost indefinitely. In case of wear or breakage of one of the links, the rivets retaining the same can be driven out with a punch and a new link and rivets replaced by any handy person this facilitates repairs since any part or number of parts can be thus removed and replaced.

The fabric thus obtained is very easily assembled and is possessed of extreme flexibility as has been explained in my other patent application above referred to, and on account of the elongated opening of the links, the pulling action of the retaining chains will quickly and easily cause the various disks to crowd against each other to form a continuous puncture proof surface.

Some of the characteristics of the present armor over the ones forming the objects of my previous patent applications are lightness and an increased facility in handling and applying, and less cost. In my other patent applications I have explained the peculiar fitness of diagonally running attaching means for this kind of devices; the diagonal pull on said attaching means causes the armor to closely fit the tire to which the same is applied thus fulfilling the most essential requirements for the proper working of the device.

In the present form of armor, the diagonal pull is obtained by means of chains 19 extending at intervals from each side of the tread portion of the armor and each constituted of a plurality of elements or disks 20, connected end to end by means of links 21. In the present example, each series of elements 20, instead of being connected directly to the tread armor, is connected thereto through a hexagonal disk 10°. These disks 10° may conveniently be simple plates instead of compound disks such as are best used in the tread portion proper. Each disk 10° is connected to the margin of the tread armor by a linking element 21 which joins one of its edges $c$ to an edge of a single disk 10$^b$ of the tread portion; and this linking element 21 is in alinement with the other links 21 of the corresponding series of disks 20. The other edge $c'$ adjacent the tread portion of the armor is left free. Consequently, assuming the traction effect or drag on the tread armor to be toward the left in Fig. 1, the pull on the diagonal chains or series of disks 20 will cause the disks of the tread portion to crowd together, and will also cause disks 10° to crowd closely against the margin of the tread portion without, however, occasioning arching. Said diagonal chains can be connected to the wheel in any suitable manner and in the drawings Fig. 1, I show the preferred form of attaching the same so as to mount the device in position. Referring to Figs. 1 and 4, 22 designates a clencher rim member provided with two series of holes 23, 24, in a staggered relation to each other; said clencher rim member is mounted on the wheel in the manner clearly illustrated in Fig. 4 and is in all respects similar to the clencher rim member illustrated in my patent application for protective armor for pneumatic tires, filed simultaneously herewith.

The holes are provided in said rim member for the purpose of attaching each chain by means of a rivet 25 connecting the last element of the chain to said rim member; said holes are arranged in a staggered relation so as to provide a means for taking up the slack, if necessary, that may occur in the armor after some use. From the drawings, it will be clearly understood that if a rivet connecting the chain to one of the holes 23 is removed and said chain is connected to the next hole, 24, to the right, the slack of the chain, if any, will thus be taken up.

In the drawings I also illustrate a novel arrangement for taking up the slack or releasing the armor to fit the proper tension of the tire, which can be quickly operated and which will take care of the slight temporary variations which may be due to different degrees of inflation of the tire.

In its preferred form illustrated in the drawings, Figs. 1, 6, 7 this adjusting device consists of an eccentric block 26 provided with an operating handle 27, mounted on a pivot 28, said pivot 28 also acting as a rivet holding the two end elements 29, 30 of each chain together, said end elements being connected to the clencher rim member by means of rivet 25.

Said eccentric block has a round boss or projection 31 on each side which is inserted through a double connecting link 32 which acts as an eccentric strap and which is connected to a loose element 20 of each chain by means of a rivet 33. In Fig. 6, it is clearly seen that bosses 31 are eccentric to hole 34 through which pivot 28 is inserted; therefore the rotating of said part 26 around pivot 28 will cause the lengthening or shortening of the chain as desired.

The eccentric device 26—27 is intended to occupy either one of two positions. In the position of the operating handle show in full lines in Fig. 1, the side chain has its greatest length. When the operating handle is turned down between the end elements 29, 30, the chain is shortened by the eccentric. The parts are so arranged and proportioned that in neither of the two positions specified is the working tension of the chain effective to alter the position of the eccentric.

In Fig. 8 I illustrate a modified form of disk for the tread portion of the tire and from the same it is seen that a master rivet 35 holds outer plate 36 and inner plate 37 of the disk together and also holds an insulating backing 38 against the face of inner plate 37. Said insulated backing is provided in the preferred form of armor to prevent wear and abrasions of the tire to which the device is applied and the same can be made of fiber or any other suitable material.

From the foregoing, it appears clear that I provide a form of armor for pneumatic tires which is new, not only in its general form, but also is new in some of its essential elements. By means of this armor the most exposed part of the tire is thoroughly protected from wear, and an excellent friction surface is provided, together with positive means for insuring the necessary tightness of the armor on the tire.

This is a most essential point in devices of this kind, and it is obvious that the same object can be attained through means other than those illustrated in the drawings but within the reach of any ordinary mechanic.

I therefore reserve myself the right to bring to my invention all those changes and modifications which may be reasonably construed as equivalents of the details shown, and which may enter fairly into the scope of the appended claims.

I claim:

1. The combination of a tread portion, a plurality of chains extending diagonally from each side of said tread portion, a clencher rim member at each side to which said chains are secured, retaining the device in position, and an eccentric block for each chain, for adjusting the length of the same, said eccentric block being operable without disturbing the attachment of the chain either to the tread portion or to the rim member.

2. A device for securing tire armor in position comprising a chain of connected links adapted for attachment at one end to said armor and at the other end to a wheel rim, one of the link connections comprising an eccentric member operable to adjust the length of the chain.

In testimony whereof I have signed this specification in the presence of two subscribing witnesses.

ROBERT C. PURVIS.

Witnesses:
W. O. PURVIS,
J. T. SHARPE.

Copies of this patent may be obtained for five cents each, by addressing the "Commissioner of Patents, Washington, D. C."